United States Patent
Richardson

(10) Patent No.: US 7,854,438 B2
(45) Date of Patent: Dec. 21, 2010

(54) SUSPENSION SYSTEM WITH SWAGED AXLE AND WELDED ARM BRACKETS AND METHOD OF MANUFACTURE

(75) Inventor: Gregory A. Richardson, Nixa, MO (US)

(73) Assignee: Tuthill Corporation, Burr Ridge, IL (US)

( * ) Notice: Subject to any disclaimer, the term of this patent is extended or adjusted under 35 U.S.C. 154(b) by 144 days.

(21) Appl. No.: 12/380,696

(22) Filed: Mar. 3, 2009

(65) Prior Publication Data

US 2009/0224503 A1 Sep. 10, 2009

Related U.S. Application Data

(60) Provisional application No. 61/068,183, filed on Mar. 5, 2008.

(51) Int. Cl.
*B60G 7/00* (2006.01)
*B60G 11/26* (2006.01)

(52) U.S. Cl. .................. 280/124.116; 280/124.157; 280/124.128; 301/124.1

(58) Field of Classification Search .......... 280/124.116, 280/124.128, 124.153, 124.157, 86.5, 124.11; 301/124.1
See application file for complete search history.

(56) References Cited

U.S. PATENT DOCUMENTS

| | | | |
|---|---|---|---|
| 2,165,472 A | 7/1939 | Friedman | |
| 2,256,065 A | 9/1941 | Urschel et al. | |
| 2,368,695 A | 2/1945 | Wilber | |
| 3,037,818 A | 6/1962 | Scheel | |
| 3,332,701 A * | 7/1967 | Masser | ............... 280/124.116 |
| 3,482,854 A | 12/1969 | Masser | |
| 3,668,918 A | 6/1972 | Benteler et al. | |
| 4,435,972 A | 3/1984 | Simon | |
| 4,452,347 A * | 6/1984 | Dozier | ...................... 188/330 |
| 4,615,539 A | 10/1986 | Pierce | |
| 4,693,486 A * | 9/1987 | Pierce et al. | ............... 280/80.1 |
| 4,854,427 A | 8/1989 | Baroni | |
| 5,112,078 A | 5/1992 | Galazin et al. | |
| 5,366,237 A | 11/1994 | Dilling et al. | |

(Continued)

*Primary Examiner*—Ruth Ilan
(74) *Attorney, Agent, or Firm*—George Pappas

(57) ABSTRACT

A trailing arm suspension system and method of manufacture wherein a tubular axle is formed with a central area and trailing arm attachment areas outboard of the central area. The axle central area and attachment areas have a substantially uniform outer surface diameter, and the wall thickness of the attachment areas is thicker/greater than the wall thickness of the central area. Inboard and outboard arm brackets are secured by welding to the axle arm attachment areas and trailing arms are secured, at one end thereof, between an inboard and an outboard arm bracket. At their other ends, the trailing arms are adapted to be pivotally secured to the vehicle. The arm brackets are secured to the axle by inserting the axle through an axle receiving hole in the brackets and providing a 360° weld bead at the interface between the axle and arm brackets. A brake spider is secured at each end of the axle outboard of the arm brackets by inserting the axle through an axle receiving hole in the spider and providing a 360° weld bead at the interface between the axle and spider. A spring seat is secured to the trailing arm and is adapted to carry a spring and transfer the vehicle weight from the spring to said trailing arm.

25 Claims, 6 Drawing Sheets

U.S. PATENT DOCUMENTS

| | | | |
|---|---|---|---|
| 5,639,110 A * | 6/1997 | Pierce et al. | 280/124.116 |
| 6,230,540 B1 | 5/2001 | Wilch et al. | |
| 6,240,806 B1 | 6/2001 | Morris et al. | |
| 6,241,266 B1 | 6/2001 | Smith et al. | |
| 6,257,597 B1 * | 7/2001 | Galazin | 280/6.151 |
| 6,827,360 B2 * | 12/2004 | Chan et al. | 280/124.116 |
| 7,090,309 B2 | 8/2006 | Blessing et al. | |
| 7,370,872 B2 * | 5/2008 | Abrat et al. | 280/124.116 |
| 7,726,673 B2 * | 6/2010 | Saieg et al. | 280/124.128 |

* cited by examiner

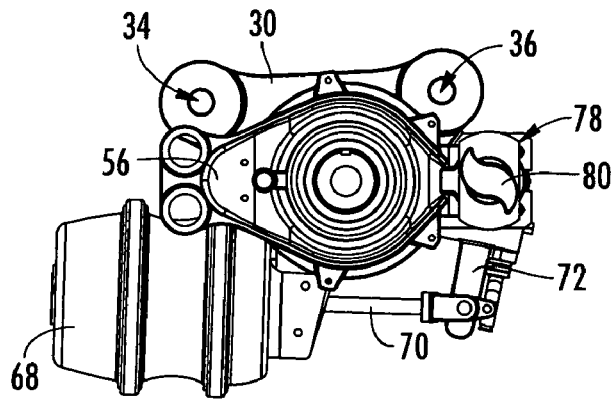
FIG. 4
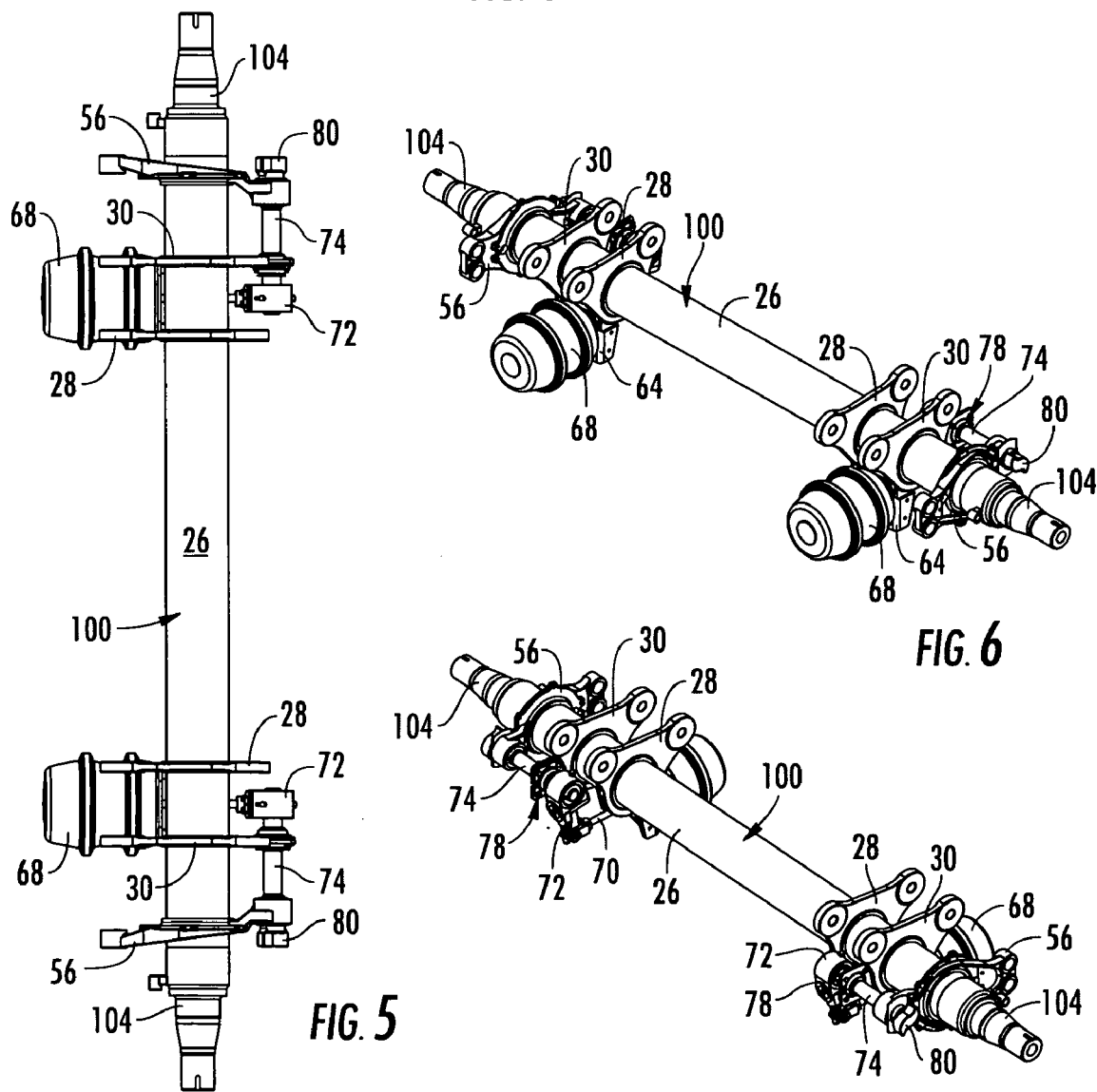
FIG. 5
FIG. 6
FIG. 7

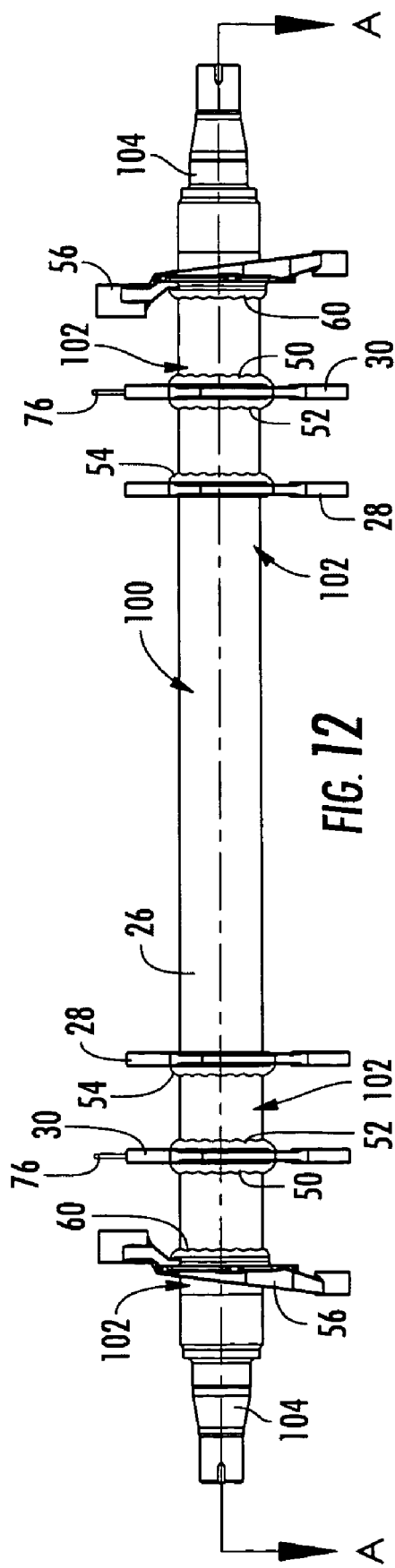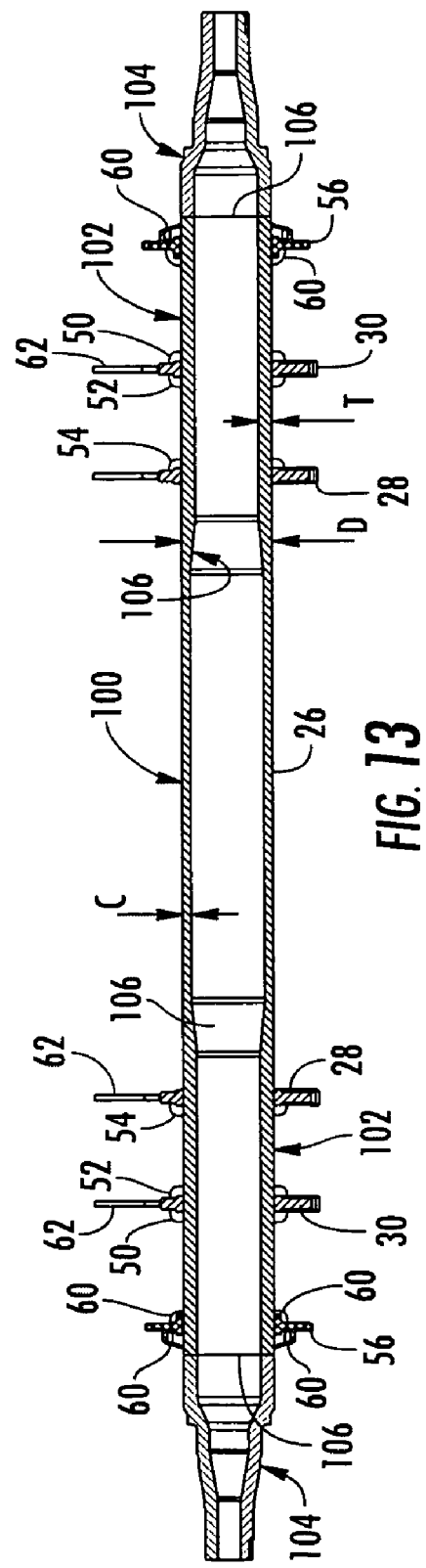

SUSPENSION SYSTEM WITH SWAGED AXLE AND WELDED ARM BRACKETS AND METHOD OF MANUFACTURE

CROSS REFERENCE TO RELATED APPLICATIONS

This application claims priority under 35 U.S.C. 119(e) of U.S. provisional patent application Ser. No. 61/068,183 filed on Mar. 5, 2008 entitled SUSPENSION SYSTEM WITH SWAGED AXLE AND WELDED ARM BRACKETS AND METHOD OF MANUFACTURE, the disclosure of which is hereby incorporated herein by reference.

TECHNICAL FIELD

The present invention relates to suspension systems for use in vehicles such as, trucks, motor homes, buses, tractors, trailers, etc. More particularly, the present invention is directed to a suspension system wherein an axle and wheels which are rotatably mounted thereon are pivotally secured to a vehicle frame with trailing arms. Yet more particularly, the present invention is directed to an improved trailing arm suspension system which is rugged and capable of carrying relatively large loads but which is relatively light weight and manufacturable at a relatively lower cost.

BACKGROUND OF THE INVENTION

Trailing arm suspension systems are known and are today commonly used on various vehicles including, for example, heavy duty trucks, semi-trucks, trailers, etc. Typically, a driven or a non-driven axle is secured to the vehicle frame with a pair of trailing arms. The trailing arms extend longitudinally under the vehicle frame and, at one end thereof, are rigidly or otherwise secured to the axle. At their other ends, the trailing arms are pivotally secured to hanger brackets which are, in turn, secured to the vehicle frame. Air and/or coil springs are provided between the vehicle frame and the trailing arms or the axle whereby the vehicle weight is transferred therethrough and to the axle and wheels. Shock absorbers are also typically provided between the vehicle frame and the trailing arms and/or the axle.

For increasing the load capacity of the suspension system, typically, the wall of the axle must be thickened to resist bending. Additionally, because most failures occur at the interconnection between the trailing arm and the axle, various trailing arm to axle connecting structures and methods have been devised. Moreover, to decrease the weight of the axle variable wall thickness axles have been devised. Examples of such prior art suspension systems and axles are shown in: Urschel et al, U.S. Pat. No. 2,256,065; Blessing et al, U.S. Pat. No. 7,090,309; Friedman, U.S. Pat. No. 2,165,472; Wilber, U.S. Pat. No. 2,368,695; Scheel; U.S. Pat. No. 3,037,818; Benteler et al, U.S. Pat. No. 3,668,918; Simon, U.S. Pat. No. 4,435,972; Wilch et al, U.S. Pat. No. 6,230,540; Dilling et al, U.S. Pat. No. 5,366,237; Morris et al, U.S. Pat. No. 6,240,806; Dozier, U.S. Pat. No. 4,452,347; Baroni, U.S. Pat. No. 4,854,427; Smith et al, U.S. Pat. No. 6,241,266; Masser, U.S. Pat. No. 3,482,854; Pierce, U.S. Pat. No. 4,615,539; and, Galazin et al, U.S. Pat. No. 5,112,078.

Notwithstanding all the prior known trailer arm suspension systems, a need still exists for a rugged, heavy duty suspension system which is relatively light weight and is relatively inexpensive to manufacture.

SUMMARY OF THE INVENTION

The object of the present invention is to provide a trailing arm suspension system which is rugged and capable of carrying significant loads, for example, greater than 20,000 lbs., and which, further, is relatively light weight and inexpensive to manufacture.

In summary, the present invention is directed to a trailing arm suspension system and method of manufacture wherein the axle is manufactured by swaging a metal/steel tube forming an axle with a central thinner wall area, and outer trailing arm attachment areas whereat the axle wall is substantially thicker. Through the swaging process, the axle, which is initially merely a tube of a given thickness, is heated to a red hot state and turned about its longitudinal axis while forming tools contact the inner and/or outer surfaces of the tube for integrally moving the steel/metal as desired and forming the axle desired wall thicknesses. Similar swaging processes of heating and forming metal tubes which are square in cross section are contemplated for forming square axles having a central thinner wall area and outer thicker wall areas whereat the trailing arms are attached.

During the swaging process, the spindles whereat the wheels are rotatably mounted are also integrally formed using the tube material by similarly spinning the tube about its longitudinal axis while the steel material is red hot and contacting with forming tools for thereby integrally forming the spindles longitudinally outboard of the trailing arm to axle connection areas. In the alternative, the spindles can be first formed and then heat welded to the terminal ends of the axle tube.

A pair of arm brackets are provided and are formed by casting or by cutting or stamping out of flat steel stock material. The brackets include an axle receiving hole and a pair of trailing arm attachment holes. During assembly, a pair of arm brackets are affixed at each axle trailing arm connection area by inserting the terminal ends of the axle through the bracket axle receiving holes, locating the brackets at the desired axial locations and welding the brackets to the axle. Preferably, welding is provided at the interface between the brackets and the axle, 360° therearound. More preferably, the inboard brackets located closest to the axle central area are not welded at the interface closest to the axle central area. The trailing arms are attached to the brackets by locating each respective trailing arm between a pair of arm brackets and extending fastening bolts through the brackets attachment holes and the trailing arm therebetween.

More preferably, a brake spider is provided having an axle receiving hole and, during assembly, is placed and located on the axle after the arm brackets are received on the axle. The brake spider is similarly placed on the axle by inserting the axle terminal end through the brake spider axle receiving hole and, after axially locating the brake spider at the desired location, affixing the brake spider to the axle by welding at the interface therebetween 360° therearound.

The resulting axle formed by the swaging process provides a thickened wall axle area at the trailing arm and spider connection areas while minimizing the thickness and weight of the axle at the central area thereof. Moreover, by axially sliding the arm brackets and spiders to their desired locations and affixing thereto by welding a secure and rugged assembly is provided for then affixing the trailing arm to the axle, but wherein such assembly is relatively less time consuming to manufacture and relatively inexpensive.

Yet more preferably, a brake chamber platform may be secured between the arm brackets for securement of a brake chamber thereto. One or both of the arm brackets may also include cam retaining extensions whereby the S-cam shaft may be rotatably mounted for extending to and through the brake spider and rotatably turning an S-cam in the brake system of each wheel.

An underslung or overslung spring seat or bracket is also provided and is affixed to the terminal end of each trailing arm. An air spring is provided between the vehicle chassis and the spring seat for transferring loads from the vehicle chassis to the trailing arms.

In one form thereof, the present invention is directed to a trailing arm suspension system for mounting ground engaging wheels to a vehicle frame. The trailing arm suspension system includes: an elongate axle having a central area, wheel supporting spindles at terminal ends outboard of the central area, and trailing arm attachment areas between the central area and each of the spindle terminal ends; the axle being tubular and integrally formed with the central area comprising a first wall thickness and the attachment areas comprising a second wall thickness, the second wall thickness being greater/thicker than the first wall thickness; an inboard and an outboard arm bracket secured by welding to the axle at each of the axle arm attachment areas; and, a pair of trailing arms, wherein each trailing arm is, at one end thereof, received between an inboard and an outboard arm bracket and secured thereto and, at its other end thereof, adapted to be pivotally secured to the vehicle.

Preferably, the trailing arm suspension system includes an axle which is cylindrical and wherein the central area and the attachment areas have a substantially uniform outer surface diameter. The inboard and outboard arm brackets preferably include an axle receiving hole, and wherein the axle is secured to each of the arm brackets by inserting the axle through the axle receiving hole and providing a weld bead at the interface between the axle and each the arm bracket. The weld bead is provided on both the inboard and outboard sides of the outboard arm brackets and a weld bead is provided only on the outboard side of the inboard arm brackets, and the weld beads extend 360° around the axle.

Preferably a brake spider is provided at each end of the axle between the spindle terminal end and the attachment area, the spiders including an axle receiving hole, and wherein each spider is secured to the axle by inserting the axle through the spider axle receiving hole and providing a weld bead at the interface between the axle and spider.

Yet more preferably, the trailing arms are made by casting. A spring seat is secured to each trailing arm, each spring seat is adapted to carry a spring and transfer the vehicle weight from the spring to the trailing arm. Additionally, the securement of each trailing arm between an inboard and an outboard arm bracket includes a central bushing and a rear bushing extending through the trailing arm, forward arm attachment holes extending through the inboard and outboard arm brackets and rearward arm attachment holes extending through the inboard and outboard arm brackets. The forward arm attachment holes are aligned with each other and the central bushing and a fastener extend therethrough, and the rearward arm attachment holes are aligned with each other and the rear bushing and a fastener extend therethrough.

In another form thereof, the present invention is directed to a method of manufacturing a trailing arm suspension system for mounting ground engaging wheels to a vehicle frame, the trailing arm suspension system including an elongate cylindrical axle having a central area, wheel supporting spindles at terminal ends outboard of the central area, and trailing arm attachment areas between the central area and each of the spindle terminal ends; a pair of trailing arms, wherein each trailing arm is, at one end thereof, secured to the axle attachment areas and, at its other end thereof, adapted to be pivotally secured to the vehicle. The method of manufacturing the suspension system includes the steps of: integrally forming the axle with the central area including a first wall thickness and the attachment areas comprising a second wall thickness, the second wall thickness being greater/thicker than the first wall thickness; providing an inboard and an outboard arm bracket secured to the axle at each of the axle arm attachment areas; and, wherein each trailing arm is secured to the axle by locating between an inboard and an outboard arm bracket and securing to the inboard and outboard arm brackets.

Preferably, the axle is formed with the central area and the attachment areas having a substantially uniform outer surface diameter. Each of the inboard and outboard arm brackets are formed with an axle receiving hole, and wherein the axle is secured to each of the arm brackets by inserting the axle through the axle receiving hole and providing a weld bead at the interface between the axle and each arm bracket. The weld beads are simultaneously provided 360° around the axle, and most preferably a weld bead is provided on both the inboard and outboard sides of the outboard arm brackets and a weld bead is provided only on the outboard side of the inboard arm brackets.

The method of manufacture further preferably includes the step of providing a brake spider at each end of the axle between the spindle terminal end and the attachment area, the spiders including an axle receiving hole, and securing each spider to the axle by inserting the axle through the spider axle receiving hole and providing a weld bead at the interface between the axle and spider. A weld bead is provided on both the inboard and outboard sides of the spiders and extending 360° around the axle.

Yet more preferably, the method includes the step of securing a spring seat to each trailing arm by welding. Each spring seat is adapted to carry a spring and transfer the vehicle weight from the spring to the trailing arm. Additionally, the securement of each trailing arm between an inboard and an outboard arm bracket includes providing a central bushing and a rear bushing extending through the trailing arm, providing forward arm attachment holes extending through the inboard and outboard arm brackets, providing rearward arm attachment holes extending through the inboard and outboard arm brackets, aligning the forward arm attachment holes with each other and the central bushing and providing a fastener therethrough, and aligning the rearward arm attachment holes with each other and the rear bushing and providing a fastener therethrough.

BRIEF DESCRIPTION OF THE DRAWINGS

The above mentioned and other features and objects of this invention and the manner of obtaining them will become more apparent, and the invention itself will be better understood by reference to the following description of embodiments of the invention taken in conjunction with the accompanying drawings wherein:

FIG. 4 is a side elevation view similar to FIG. 3, but wherein the trailing arm has been eliminated and the brake chamber and S-cam are shown;

FIG. 5 is a top view of a swaged axle, arm brackets, spiders and brake chambers assembly constructed in accordance with the principles of the present invention;

FIG. 6 is a perspective view of the assembly shown in FIG. 5 depicting the brake chambers;

FIG. 7 is a perspective view of the assembly shown in FIG. 5 depicting the S-cam shaft;

FIG. 12 is a side elevation view of a swaged axle, arm brackets and spiders assembly constructed in accordance with the principles of the present invention; and, FIG. 13 is a cross sectional view of the assembly shown in FIG. 12 taken along line A-A.

Corresponding reference characters indicate corresponding parts throughout the several views of the drawings.

Figure 1:
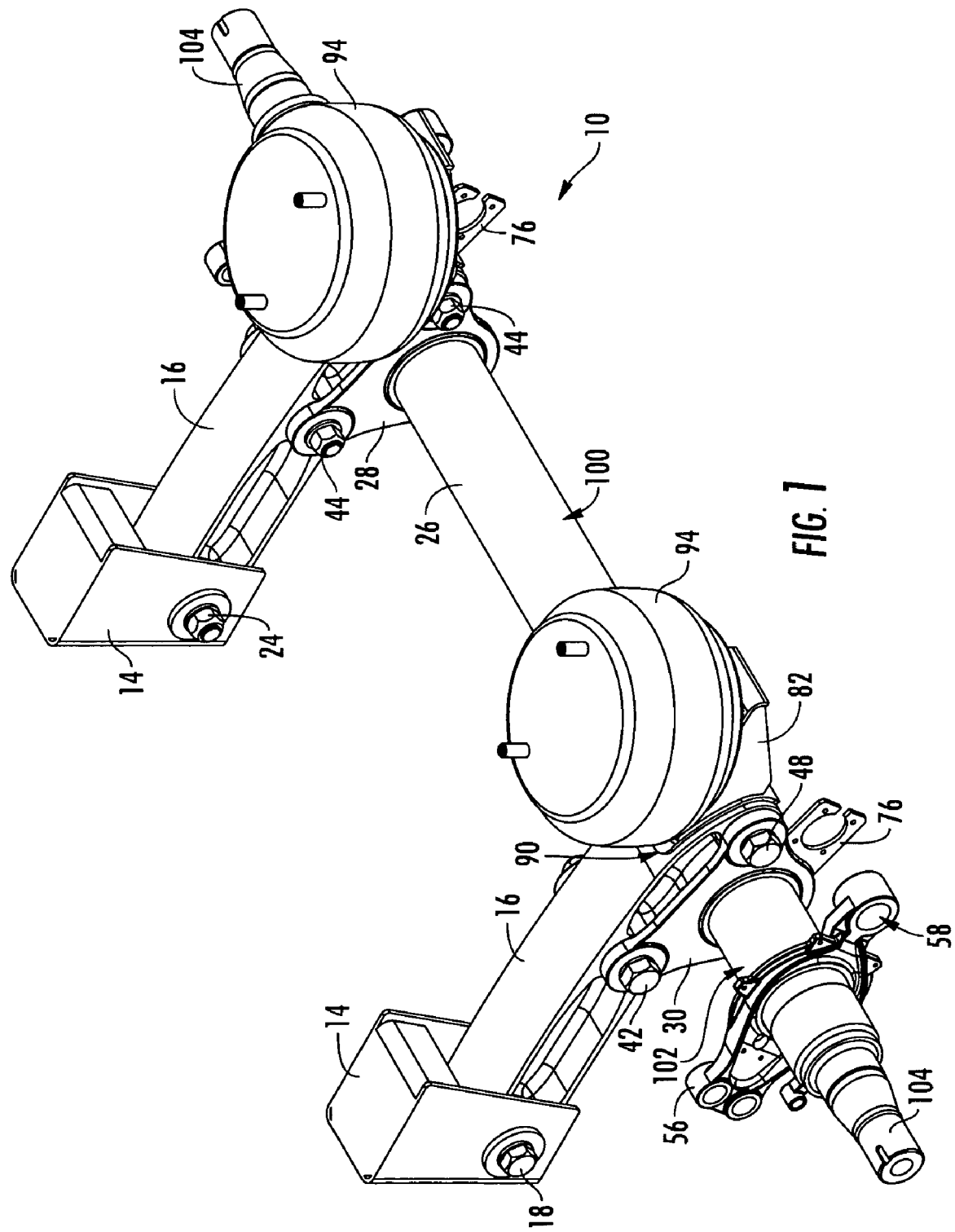
FIG. 1 is a perspective view of a suspension system with a swaged axle and welded arm brackets constructed in accordance with the principles of the present invention.
Figure 2:
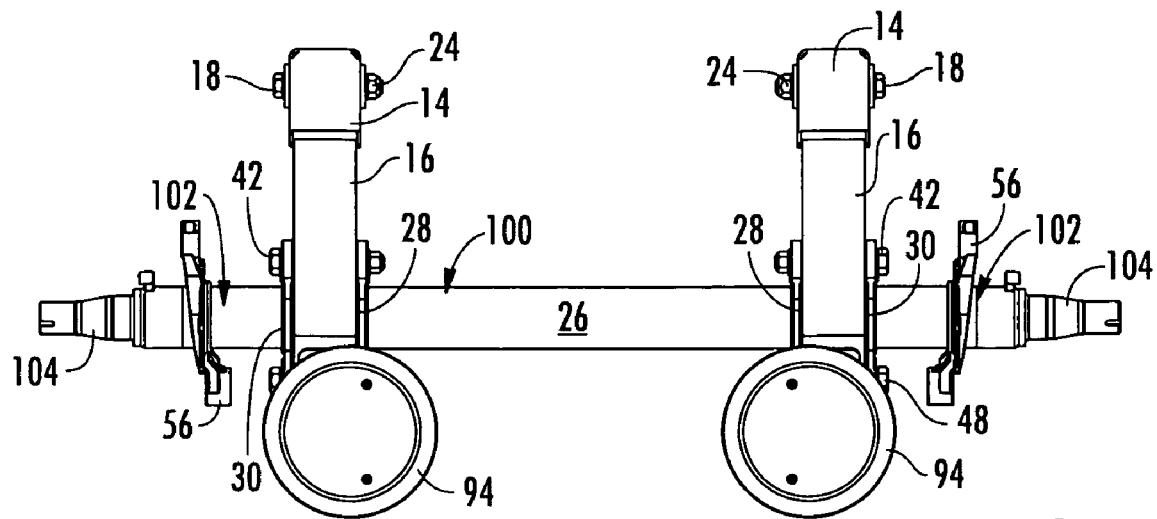
FIG. 2 is a top plan view of the suspension system shown in FIG. 1.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Referring now to the drawings, a suspension system constructed in accordance with the principles of the present invention is shown and generally designated by the numeral 10. Suspension system 10 is adapted to be mounted under a vehicle chassis 12 which is diagrammatically designated by a dash line in FIG. 3. Suspension system 10 includes a pair of hanger brackets 14 adapted to be mounted to the vehicle chassis 12 and extend downwardly therefrom. A trailing arm 16 is pivotally secured to each of the hanger brackets 14 with a fastening bolt 18 which extends through holes 20 at the lower end of the hanger brackets and the bushing 22 at the terminal end of the trailing arm 16. Washers and nuts 24 are used for securing the bolts 18 through the hanger holes 20 and the bushings 22 and thereby pivotally securing the trailing arms 16 to the hanger brackets 14. The trailing arms 16 extend longitudinally under and along the vehicle chassis 12.

An axle 26 is secured to the other end of trailing arms 16 and pivots therewith about the pivot axis of bolt 18. More particularly, each of the trailing arms 16 are secured to the axle 26 using an inboard arm bracket 28 and an outboard arm bracket 30. Inboard and outboard arm brackets 28, 30 are similarly shaped and are made by casting or cutting or stamping out of flat steel stock material. Each of the arm brackets 28, 30 include an axle receiving hole 32 adapted to receive therethrough the axle 26. Holes 32 are substantially the same diameter as the outer diameter of the axle 26 or holes 32 are slightly smaller than the outer diameter of axle 26 such that, upon inserting axle 26 through holes 32, an interference/frictional fit or engagement is provided between the brackets 28, 30 and axle 26. Advantageously, for securing the brackets 28, 30 on the axle 26, the brackets 28, 30 are slipped over the terminal end of the axle 26 by placing the terminal end through the axle receiving holes 32 of the brackets 28 and 30 as designated by the arrow 34 and locating the brackets 28, 30 at the desired axial location on the axle 26 for securement of the trailing arm 16 thereto.

Each of the arm brackets 28, 30 include forward arm attachment holes 34 and rearward arm attachment holes 36. For securing a trailing arm 16 to the axle 26, the trailing arm 16 is placed or sandwiched between an inboard arm bracket 28 and an outboard arm bracket 30 with the forward arm attachment holes 34 aligned with the central bushing 38 extending perpendicularly through the trailing arm 16, and with the rearward arm attachment holes 36 aligned with the rear bushing 40 which extends perpendicularly through the trailing arm 16. Fastening bolts 42 are then placed through the aligned forward arm attachment holes 34 and central bushing 38 and secured as shown with a nut 44 and washers 46. Similarly, a fastening bolt 48 is placed through aligned rearward arm attachment holes 36 and the rear bushing 40 and is secured thereto with nuts 44 and washers 46. It is noted that bushings 22, 38 and 40 are made of a resilient material such as rubber for providing some flexibility between the assembled components as desired during use of the suspension system 10.

As should now be appreciated, when affixing the arm brackets 28, 30 to the axle 26 care is taken to properly locate the arm bracket 28, 30 at the correct desired axial/longitudinal location along the axle; to provide a correct/desired distance between the arm bracket 28 and arm bracket 30 for receiving an arm 16 therebetween; to radially locate brackets 28, 30 at the correct radial location relative to the radial location of the axle 26; and, to radially align the arm bracket 28 relative to the arm bracket 30 such that the forward arm attachment holes 34 of arm brackets 28 and 30 are aligned with one another and the rearward arm attachment holes 36 of the arm brackets 28 and 30 are aligned with one another. Upon placement of the arm brackets 28, 30 at the desired axial and radial locations relative to the axle 26 and relative to one another, the arm brackets 28, 30 are secured to the axle 26 by welding. Preferably, a weld bead 50 is provided on the outboard side of the outboard arm bracket 30 at the interface between the bracket 30 and axle 26, 360° therearound. Similarly, a weld bead 52 is provided on the inboard side of bracket 30 at the interface between bracket 30 and the axle 26, 360° therearound. The inboard arm bracket 28 is similarly secured with a weld bead 54 on the outboard side of arm bracket 28 at the interface between the arm bracket 28 and the axle 26, 360° therearound. A weld bead is preferably not provided on the inboard side of the inboard bracket 28 for preventing possible fatigue fractures as a result of the bending experienced by the axle 26.

A brake spider 56 is provided and, similar to the arm brackets 28, 30, includes an axle receiving hole 32. Brake spider 56 further includes an S-cam shaft bearing hole 58. Brake spider 56 is affixed to the axle 26 similar to the arm brackets 28, 30 by first inserting the axle 26 through the brake spider axle receiving hole 32 and axially sliding the brake spider 56 to the desired location axially/longitudinally along the axle 26 and also radially aligning the brake spider relative to the axle 26. Once located at the desired axial and radial location, the brake spider 56 is also welded to the axle 26 with outboard and inboard weld beads 60 which are provided at both the inboard and outboard interfaces between the brake spider and axle 26, 360° therearound.

Figure 9:
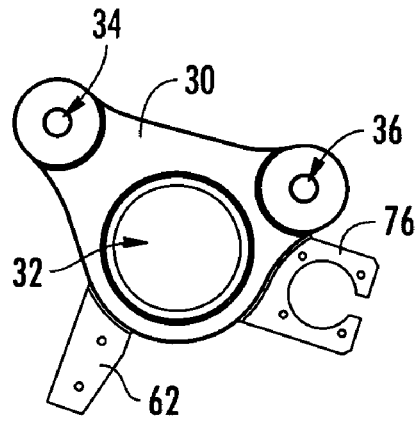
FIG. 9 is a side elevation view of an arm bracket including an extension for attachment of the brake chamber and an extension for pivotally securing the S-cam brake shaft.
Figure 10:
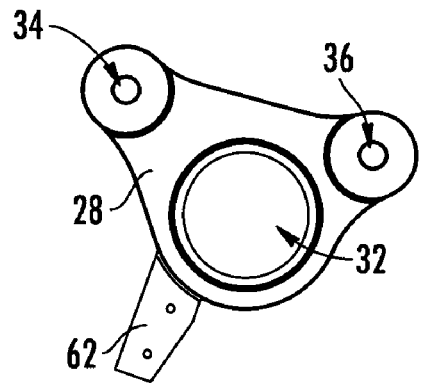
FIG. 10 is a side elevation view of an arm bracket including only an extension for attachment of the brake chamber.

As best seen in FIGS. 9 and 10 both of the arm brackets 28 and 30 are preferably provided with an extension portion 62. A brake chamber platform bracket 64 is mounted on the extension portions 62 of brackets 28, 30 with fastening screws 66. Brake chamber 68 is mounted on the platform bracket 64. Brake chamber 68 includes an actuator arm 70 pivotally secured to the S-cam shaft arm 72 which is, in turn, secured to the S-cam shaft 74. The outboard arm bracket 30 is also provided with an S-cam shaft extension 76 and the S-cam shaft 74 is pivotally secured thereon with a bearing assembly 78. The S-cam shaft 74 also extends through the bearing hole 58 of the brake spider 56 and includes an S-cam portion 80 adapted to engage the brake assembly in a known and customary manner.

As should now be appreciated a relatively efficient and relatively low cost method is provided for locating the arm brackets 28, 30 and the brake spider 56 on the axle 26 by axially sliding them onto the axle one after the other at the desired axial/longitudinal location on the axle 26, radially aligning them and, thereafter, welding in place and rigidly securing the arm brackets 28, 30 and brake spider 56 to the axle 26. It is further contemplated that the arm brackets 28, 30 and brake spider 56 will be placed at the desired location with jig or other suitable means and the weld beads 50, 52, 54 and 60 will be provided with a robot welder, preferably simultaneously.

Figure 3:
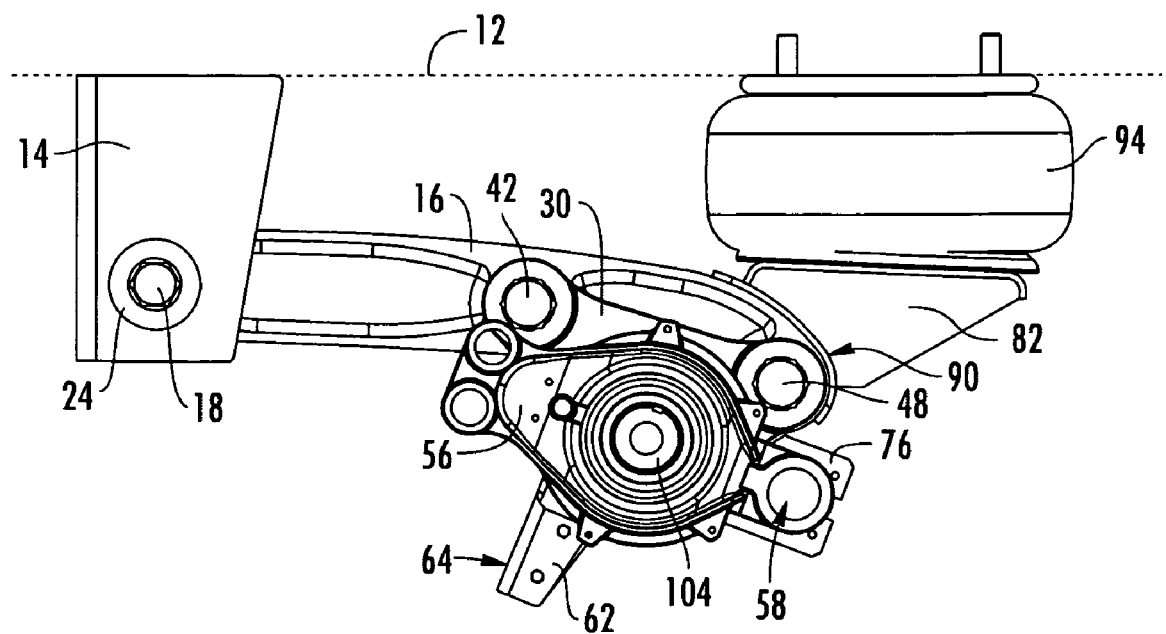
FIG. 3 is a side elevation view of the suspension system shown in FIG. 1.
Figure 8:
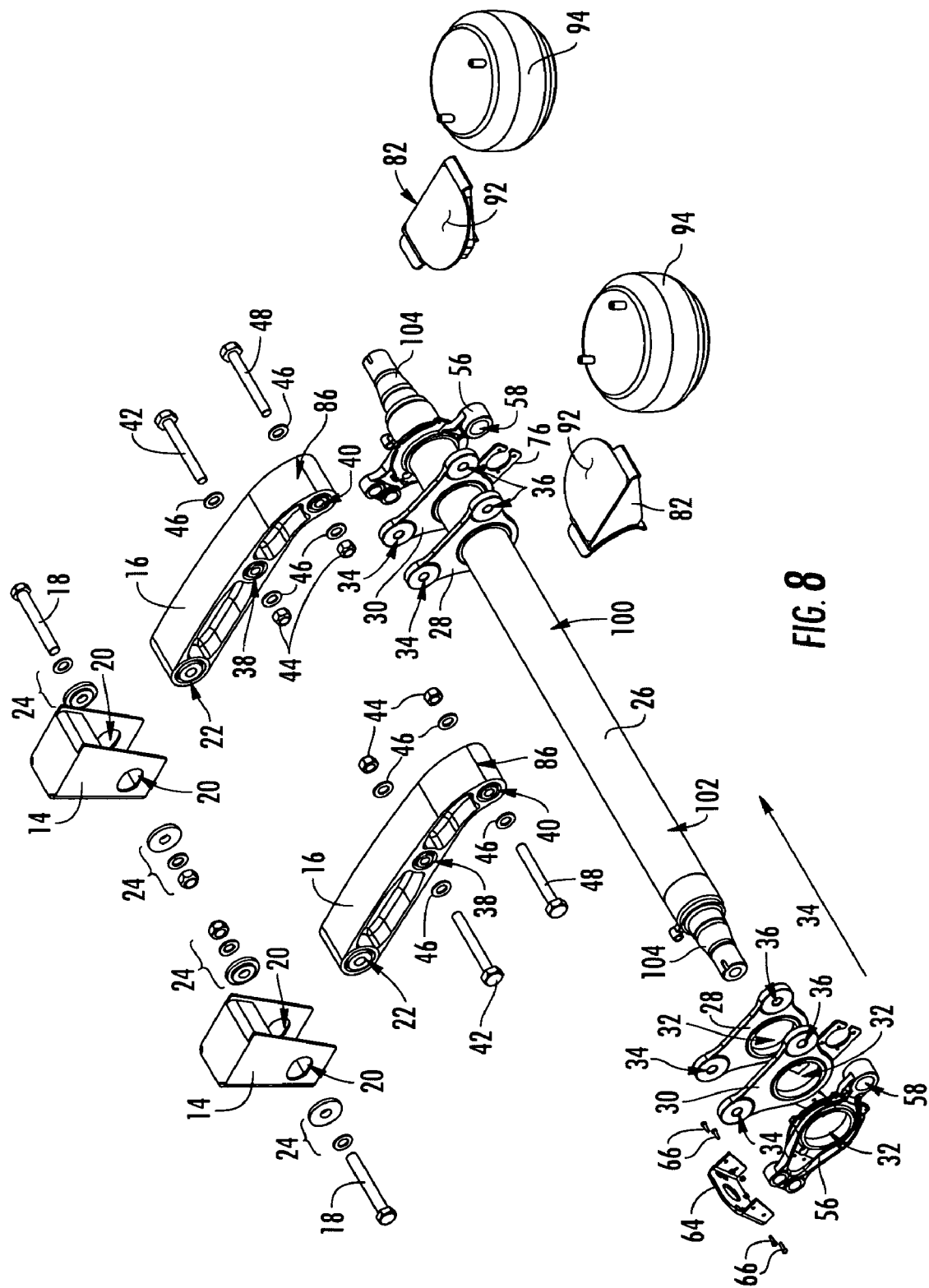
FIG. 8 is an exploded view of the suspension system shown in FIG. 1 depicting the components thereof in accordance with the principles of the present invention.

As best seen in FIG. 3, a spring seat 82 is provided and is affixed to the terminal end 84 of the trailing arm 16. Preferably, the terminal end 84 includes an outer terminal surface 86 and the spring seat 82 includes a corresponding mounting surface 88. For attaching the spring seat 82 to the trailing arm 16, the mounting surface 88 thereof is placed against the outer surface 86 of the trailing arm 16 and weld beads 90 are provided at the interface between surfaces 86 and 88. Spring seat 82 includes a seating surface 92 and an air spring 94 is provided between the vehicle chassis 12 and the seating surface 92. Accordingly, the weight from the vehicle chassis 12 is transferred through the air spring 94 to the trailing arm 16 through the spring seat 82, and from the trailing arm 16 to the arm brackets 28, 30 to the axle 26.

Figure 11:
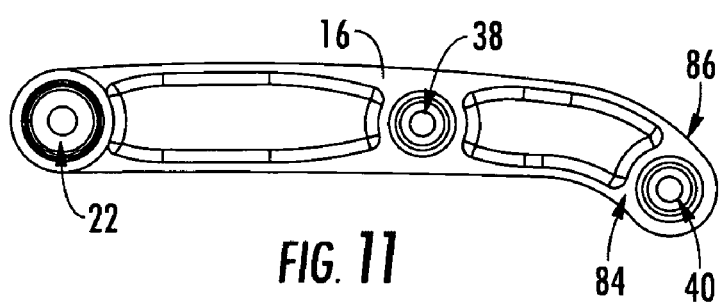
FIG. 11 is a side elevation view of a trailing arm constructed in accordance with the principles of the present invention.
Figure 11A:
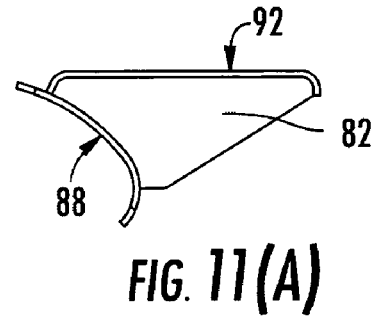
FIG. 11(a) is a side elevation view of an overslung spring seat for attachment to the trailing arm.
Figure 11B:
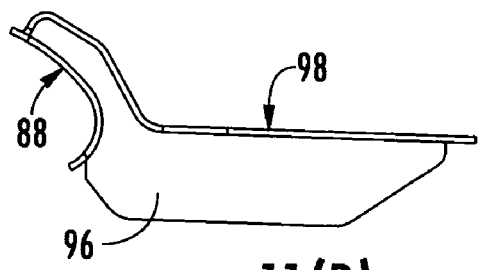
FIG. 11(b) is a side elevation view of an underslung spring seat for attachment to the trailing arm.

FIG. 11(a) depicts the spring seat 82 which is of the "overslung" type. In FIG. 11(b) an "underslung" type spring seat 96 is depicted whereby the seating surface 98 thereof is located a further distance from the chassis 12 as compared to the seating surface 92 of the overslung spring seat 92.

Referring now more particularly to FIGS. 12 and 13 the axle 26, in accordance with the principles of the present invention, is shown and includes a central area 100, outer trailing arm attachment areas 102 and spindles 104 axially outboard at the terminal ends of the trailing arm attachment areas 102. Spindles 104 are provided with an outer surface for accommodating and rotatably mounting a wheel (not shown) thereon in a known and customary manner. The outer surface of the axle central area 100 and trailing arm attachment areas 102 are cylindrical or rectangularly shaped and are preferably uniform along the entire longitudinal length thereof. Preferably, the outer surface diameter D of the central area 100 and the attachment areas 102 is uniform and is about 5.0 to 6.5 inches and, most preferably, about 5.75 inches. The wall thickness C of the central area 100 is thinner than the wall thickness T of the trailing arm attachment areas 102. Additionally, the transition from the thinner wall thickness C to the thicker wall thickness T is gradual and frusto-conical shaped as indicated by the area 106. Most preferably the wall thickness C is 0.375-0.625 inches and most preferably 0.50 inches, whereas the wall thickness T is preferably 0.5-0.75 inches and, most preferably 0.625 inches. As can now be appreciated, by minimizing the axle thickness at the central area 100 and maximizing the wall thickness at the trailing arm attachment areas 102 the weight of the axle 26 is minimized while the axle strength is maximized where needed most, namely, at the trailing arm attachment areas 102.

Most preferably, for decreasing manufacturing costs, axle 26 is made by swaging a steel tube of an initial generally uniform wall thickness to the shape shown in FIG. 13. In this regard, a steel/metal tube is heated to a red hot state and turned about its longitudinal axis while forming tools are placed in contact with the inner and/or outer surfaces of the tube. In this manner, the metal/steel is integrally formed and moved as desired for forming the axle central area 100 having a wall thickness C and the trailing arm attachment areas 102 outboard therefrom having a thicker wall thickness T. Moreover, during the swaging process, the outer surface of the axle 26 is maintained generally uniform having a diameter D. The spindles 104 are similarly swaged and are integrally formed thereon at the ends of the trailing arm attachment areas 102. In the alternative, the spindles 104 are first separately formed and, thereafter, are heat welded at interface 106 as depicted in FIG. 13.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A trailing arm suspension system for mounting ground engaging wheels to a vehicle frame, said trailing arm suspension system comprising:

an elongate axle having a central area, wheel supporting spindles at terminal ends outboard of said central area, and trailing arm attachment areas between said central area and each of said spindle terminal ends;

said axle being tubular and integrally formed with said central area comprising a first wall thickness and said attachment areas comprising a second wall thickness, said second wall thickness being greater than said first wall thickness;

an inboard and an outboard arm bracket secured by welding to said axle at each of said axle arm attachment areas;

a pair of trailing arms, wherein each trailing arm is, at one end thereof, received between an inboard and an outboard arm bracket and secured thereto and, at its other end thereof, adapted to be pivotally secured to the vehicle; and, wherein each of said inboard and outboard arm brackets include an axle receiving hole, and wherein said axle is secured to each of said arm brackets by inserting the axle through said axle receiving hole and providing a weld bead at the interface between said axle and each said arm bracket.

2. The trailing arm suspension system of claim 1 wherein said axle is cylindrical and wherein said central area and said attachment areas have a substantially uniform outer surface diameter.

3. The trailing arm suspension system of claim 1 wherein a weld bead is provided on both the inboard and outboard sides of said outboard arm brackets and a weld bead is provided only on the outboard side of said inboard arm brackets.

4. The trailing arm suspension system of claim 3 wherein said weld beads extend 360° around said axle.

5. The trailing arm suspension system of claim 1 further comprising a brake spider at each end of said axle between said spindle terminal end and said attachment area, said spiders including an axle receiving hole, and wherein each said spider is secured to said axle by inserting the axle through said spider axle receiving hole and providing a weld bead at the interface between said axle and spider.

6. The trailing arm suspension system of claim 1 wherein said trailing arms are made by casting.

7. The trailing arm suspension system of claim 1 further comprising a spring seat secured to each said trailing arm, each said spring seat adapted to carry a spring and transfer the vehicle weight from the spring to said trailing arm.

8. The trailing arm suspension system of claim 1 wherein said securement of each trailing arm between an inboard and an outboard arm bracket includes a central bushing and a rear bushing extending through said trailing arm, forward arm attachment holes extending through said inboard and outboard arm brackets, rearward arm attachment holes extending through said inboard and outboard arm brackets, said forward arm attachment holes aligned with each other and said central bushing and a fastener extending therethrough, and said rearward arm attachment holes aligned with each other and said rear bushing and a fastener extending therethrough.

9. The trailing arm suspension system of claim 1 wherein said axle is cylindrical and wherein said central area and said attachment areas have a substantially uniform outer surface diameter; wherein said weld bead is provided at the interface between said axle and each said arm bracket on both the inboard and outboard sides of said outboard arm brackets and only on the outboard side of said inboard arm brackets; a brake spider at each end of said axle between said spindle terminal end and said attachment area, said spiders including an axle receiving hole, and wherein each said spider is secured to said axle by inserting the axle through said spider axle receiving hole and providing a weld bead at the interface between said axle and spider; a spring seat secured to each said trailing arm, each said spring seat adapted to carry a spring and transfer the vehicle weight from the spring to said trailing arm; and, further wherein said securement of each trailing arm between an inboard and an outboard arm bracket includes a central bushing and a rear bushing extending through said trailing arm, forward arm attachment holes extending through said inboard and outboard arm brackets, rearward arm attachment holes extending through said inboard and outboard arm brackets, said forward arm attachment holes aligned with each other and said central bushing and a fastener extending therethrough, and said rearward arm attachment holes aligned with each other and said rear bushing and a fastener extending therethrough.

10. In a trailing arm suspension system for mounting ground engaging wheels to a vehicle frame, said trailing arm suspension system comprising an elongate cylindrical axle having a central area, wheel supporting spindles at terminal ends outboard of said central area, and trailing arm attachment areas between said central area and each of said spindle terminal ends; a pair of trailing arms, wherein each trailing arm is, at one end thereof, secured to the axle attachment areas and, at its other end thereof, adapted to be pivotally secured to the vehicle, a method of manufacturing said trailing arm suspension system comprising the steps of:

integrally forming said axle with said central area comprising a first wall thickness and said attachment areas comprising a second wall thickness, said second wall thickness being greater than said first wall thickness;

providing an inboard and an outboard arm bracket and securing said arm brackets to said axle at each of said axle arm attachment areas;

wherein each said trailing arm is secured to the axle by locating between an inboard and an outboard arm bracket and securing to said inboard and outboard arm brackets; and, wherein each of said inboard and outboard arm brackets are formed with an axle receiving hole, and wherein said axle is secured to each of said arm brackets by inserting the axle through said axle receiving hole and providing a weld bead at the interface between said axle and each said arm bracket.

11. The method of manufacture of claim 10 wherein said axle is formed with said central area and said attachment areas having a substantially uniform outer surface diameter.

12. The method of manufacture of claim 10 wherein said weld beads are simultaneously provided and extend 360° around said axle.

13. The method of manufacture of claim 12 wherein a weld bead is provided on both the inboard and outboard sides of said outboard arm brackets and a weld bead is provided only on the outboard side of said inboard arm brackets.

14. The method of manufacture of claim 10 further comprising the step of providing a brake spider at each end of said axle between said spindle terminal end and said attachment area, said spiders including an axle receiving hole, and securing each said spider to said axle by inserting the axle through said spider axle receiving hole and providing a weld bead at the interface between said axle and spider.

15. The method of manufacture of claim 14 wherein a weld bead is provided on both the inboard and outboard sides of said spiders and extending 360° around said axle.

16. The method of manufacture of claim 10 further comprising the step of securing a spring seat to each said trailing arm by welding, each said spring seat adapted to carry a spring and transfer the vehicle weight from the spring to said trailing arm.

17. The method of manufacture of claim 10 wherein said securement of each trailing arm between an inboard and an outboard arm bracket includes providing a central bushing and a rear bushing extending through said trailing arm, providing forward arm attachment holes extending through said inboard and outboard arm brackets, providing rearward arm attachment holes extending through said inboard and outboard arm brackets, aligning said forward arm attachment holes with each other and said central bushing and providing a fastener therethrough, and aligning said rearward arm attachment holes with each other and said rear bushing and providing a fastener therethrough.

18. The method of manufacture of claim 10 wherein said axle is formed with said central area and said attachment areas having a substantially uniform outer surface diameter; wherein a weld bead is provided on both the inboard and outboard sides of said outboard arm brackets and a weld bead is provided only on the outboard side of said inboard arm brackets; providing a brake spider at each end of said axle between said spindle terminal end and said attachment area, said spiders including an axle receiving hole, and securing each said spider to said axle by inserting the axle through said spider axle receiving hole and providing a weld bead at the interface between said axle and spider on both the inboard and outboard sides of said spiders; securing a spring seat to each said trailing arm by welding, each said spring seat adapted to carry a spring and transfer the vehicle weight from the spring to said trailing arm; and, wherein said securement of each trailing arm between an inboard and an outboard arm bracket includes providing a central bushing and a rear bushing extending through said trailing arm, providing forward arm attachment holes extending through said inboard and outboard arm brackets, providing rearward arm attachment holes extending through said inboard and outboard arm brackets, aligning said forward arm attachment holes with each other and said central bushing and providing a fastener therethrough, and aligning said rearward arm attachment holes with each other and said rear bushing and providing a fastener therethrough.

19. A trailing arm suspension system for mounting ground engaging wheels to a vehicle frame, said trailing arm suspension system comprising:
- a tubular elongate axle having a central area, wheel supporting spindles at terminal ends outboard of said central area, and trailing arm attachment areas between said central area and each of said spindle terminal ends;
    - an inboard and an outboard arm bracket secured by welding to said axle at each of said axle arm attachment areas;
    - a pair of trailing arms, wherein each trailing arm is, at one end thereof, secured to an inboard and an outboard arm bracket and, at its other end thereof, adapted to be pivotally secured to the vehicle; and,
    - wherein each of said inboard and outboard arm brackets include an axle receiving hole, and wherein said axle is secured to each of said arm brackets by inserting the axle through said axle receiving hole and providing a weld bead at the interface between said axle and each said arm bracket.

20. The trailing arm suspension system of claim 19 wherein a weld bead is provided on both the inboard and outboard sides of said outboard arm brackets and a weld bead is provided only on the outboard side of said inboard arm brackets.

21. The trailing arm suspension system of claim 19 wherein said weld beads extend 360° around said axle.

22. The trailing arm suspension system of claim 19 further comprising a brake spider at each end of said axle between said spindle terminal end and said attachment area, said spiders including an axle receiving hole, and wherein each said spider is secured to said axle by inserting the axle through said spider axle receiving hole and providing a weld bead at the interface between said axle and spider.

23. The trailing arm suspension system of claim 19 wherein said trailing arms are made by casting.

24. The trailing arm suspension system of claim 19 further comprising a spring seat secured to each said trailing arm, each said spring seat adapted to carry a spring and transfer the vehicle weight from the spring to said trailing arm.

25. The trailing arm suspension system of claim 19 wherein said securement of each trailing arm to an inboard and an outboard arm bracket includes a central bushing and a rear bushing extending through said trailing arm, forward arm attachment holes extending through said inboard and outboard arm brackets, rearward arm attachment holes extending through said inboard and outboard arm brackets, said forward arm attachment holes aligned with each other and said central bushing and a fastener extending therethrough, and said rearward arm attachment holes aligned with each other and said rear bushing and a fastener extending therethrough.

* * * * *